UNITED STATES PATENT OFFICE.

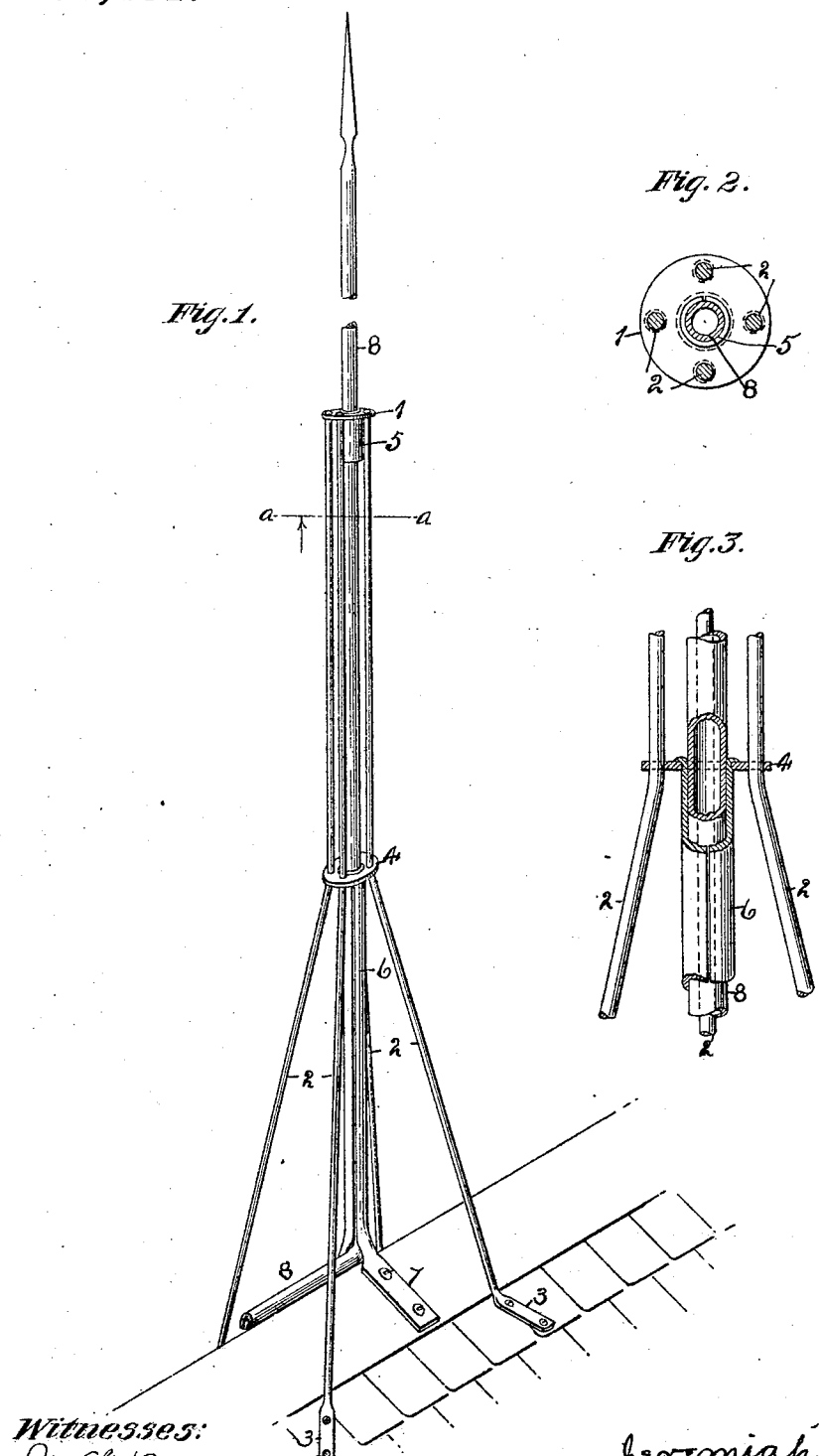

JEREMIAH J. MAHER, OF PRESTON, IOWA.

LIGHTNING-ROD SUPPORT.

950,181.

Specification of Letters Patent. Patented Feb. 22, 1910.

Application filed November 1, 1909. Serial No. 525,840.

*To all whom it may concern:*

Be it known that I, JEREMIAH J. MAHER, a citizen of the United States, residing at Preston, in the county of Jackson and State of Iowa, have invented certain new and useful Improvements in Lightning-Rod Supports, of which the following is a specification.

The object of this invention is to construct a support for lightning rods, in which the rod has long bearings to prevent the wearing of the rod.

In the accompanying drawings, Figure 1 is a perspective view of my improved lightning rod support, with a rod held thereby. Fig. 2 is a section on dotted line *a a* Fig. 1. Fig. 3 is a partial elevation with parts broken away.

My improved lightning rod support comprises a head 1 supported by the four corner braces 2, having their lower ends provided with feet 3. A collar 4 is formed with perforations through which the braces 2 pass. A bushing 5 is supported by the head 1 and a bushing 6 is supported by the collar 4, and has its lower portion formed with feet 7. A lightning rod or tube 8 is located in the bushings 5 and 6, its upper end projecting above the head 1.

In use the feet 3 of the braces 2 and the feet 7 of the bushing 6 are secured to the roof of a building which will hold the lightning rod 8 in a vertical position. The length of the bushings 5 and 6 will hold the lightning rod against lateral movement thereby preventing wear of the rod at these points.

I claim as my invention.

A lightning rod support comprising a head, a collar, braces connected to the head and collar and having their lower ends formed with feet, tubular bushings supported by the head and collar, and the bushings supported by the collar having its lower end formed with feet.

In testimony whereof I have hereunto set my hand in presence of two subscribing witnesses.

JEREMIAH J. MAHER.

Witnesses:
G. E. BARTHOLOMEW,
JOHN SHEETZ.